US012752424B2

(12) United States Patent
Sanan et al.

(10) Patent No.: US 12,752,424 B2
(45) Date of Patent: Oct. 6, 2026

(54) METHOD AND APPARATUSES FOR PATH PLANNING FOR A ROBOTIC MANIPULATOR

(71) Applicant: Omron Corporation, Kyoto (JP)

(72) Inventors: Siddharth Sanan, Santa Clara, CA (US); Soma Boubou, Pleasanton, CA (US); Andres Rodriguez Campo, Dublin, CA (US); Gaurav Misra, Milpitas, CA (US); David von Edge, San Francisco, CA (US); Kazuma Tabuchi, Kyoto (JP); Sean Bailey, Emeryville, CA (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 19/096,030

(22) Filed: Mar. 31, 2025

(65) Prior Publication Data

US 2026/0295834 A1 Oct. 1, 2026

(51) Int. Cl.
*B25J 9/16* (2006.01)

(52) U.S. Cl.
CPC ........... *B25J 9/1664* (2013.01); *B25J 9/1697* (2013.01)

(58) Field of Classification Search
None
See application file for complete search history.

(56) References Cited

U.S. PATENT DOCUMENTS 5,047,916 A * 9/1991 Kondo .................. B25J 9/1666 700/61
9,789,608 B2 10/2017 Itkowitz et al.
11,235,466 B2 2/2022 Gupta et al.
2017/0165835 A1* 6/2017 Agarwal ................. B25J 9/163
2018/0306587 A1* 10/2018 Holz .................... G01C 21/206
2019/0278291 A1* 9/2019 Ebrahimi Afrouzi .. G01C 22/02
2020/0086486 A1* 3/2020 Graichen ............... B25J 9/1676
2021/0080970 A1 3/2021 Husain et al.
2022/0371199 A1* 11/2022 Schultz .................. B25J 9/1697
2023/0356406 A1 11/2023 Tonogai et al.
2023/0364795 A1 11/2023 Tonogai et al.
(Continued)

FOREIGN PATENT DOCUMENTS

CN 114939872 A * 8/2022 ........... B25J 9/1666
EP 2221152 A1 8/2010
(Continued)

OTHER PUBLICATIONS

"Veo Robotics", https://www.veobot.com/.
(Continued)

*Primary Examiner* — Khoi H Tran
*Assistant Examiner* — Dairon Estevez
(74) *Attorney, Agent, or Firm* — Murphy, Bilak & Homiller, PLLC

(57) ABSTRACT

Disclosed methods and apparatuses provide an advantageous approach to path planning for moving a robotic manipulator from a starting pose to a goal pose, in cases where the goal pose is within unseen space or advancing the robotic manipulator to the goal pose requires movement through or in unseen space. A particular aspect of the approach is the use of an exploration procedure for efficiently exposing unseen space, for advancing the robotic manipulator to the goal pose.

26 Claims, 11 Drawing Sheets

(56) References Cited

U.S. PATENT DOCUMENTS

| | | | | |
|---|---|---|---|---|
| 2024/0066698 | A1* | 2/2024 | Campos Macias | B25J 9/1676 |
| 2025/0060729 | A1* | 2/2025 | De La Guardia Gonzalez | B25J 9/1666 |
| 2025/0214242 | A1* | 7/2025 | Campos Macias | B25J 9/1664 |
| 2026/0014707 | A1 | 1/2026 | Takahashi et al. | |

FOREIGN PATENT DOCUMENTS

| | | | |
|---|---|---|---|
| GB | 2592838 | A | 9/2021 |
| JP | 2003266345 | A | 9/2003 |
| JP | 2008279524 | A | 11/2008 |
| JP | 5250858 | B2 | 4/2013 |
| JP | 2022065929 | A | 4/2022 |
| JP | 2022070079 | A | 5/2022 |
| WO | 2024105783 | A1 | 5/2024 |

OTHER PUBLICATIONS

Kappler, et al., "Real-time Perception meets Reactive Motion Generation", IEEE Robotics and Automation Letters, 2018, 9 pages.
Srinivasa, et al., "HERB: a home exploring robotic butler", Autonomous Robots, 28, 2010, 5-20.
"PCT ISR & Written Opinion for App No. PCT/JP2026/009647", May 26, 2026, 8 pages.

* cited by examiner

METHOD AND APPARATUSES FOR PATH PLANNING FOR A ROBOTIC MANIPULATOR

TECHNICAL FIELD

Disclosed methods and apparatuses provide an advantageous approach to path planning for moving a robotic manipulator from a starting pose to a goal pose, in cases where the goal pose is within unseen space or advancing the robotic manipulator to the goal pose requires movement through or in unseen space.

BACKGROUND

In relation to a robotic manipulator, the terms "operational space," "workspace," and "task space" interchangeably refer to the physical space in which the robotic manipulator performs tasks. Here, "robotic manipulator" refers to a particular class of robots. Robotic manipulators are characteristically configured for handling, moving, or manipulating objects, and typically consist of joints and links resembling an arm, along with an end effector, such as a gripper, suction cup, tool, etc. Robotic manipulators find wide use in industrial automation, such as in manufacturing assembly or welding, materials handling, and pick-and-place operations.

A robotic manipulator moves within a configuration space or "C-space." C-space is an abstract mathematical space that represents all possible internal states of the joints or actuators of the robotic manipulator, with each dimension in C-space corresponding to a respective degree of freedom (DoF) for movement of the robot.

Consider a 6-DoF robot arm, where the corresponding C-space is six-dimensional, with each dimension representing a respective joint angle of the robot arm. Of course, if the robot arm itself is mobile, e.g., integrated on a wheeled or tracked platform, the C-space will have additional dimensions representing these additional degrees of freedom.

Points in C-space map to points in the operational space—the three-dimensional physical environment in which the robotic manipulator operates—through forward kinematics. However, C-space provides a natural framework for robot path planning, because C-space incorporates the constraints applicable to movement of the robotic manipulator. Here, "path planning" refers to the computational process of determining a collision-free route that allows a robotic manipulator to move from a current or initial pose to a goal pose, while considering physical constraints on its movement and obstacles in the environment. A "pose" here refers to a particular configuration of the robotic manipulator in its C-space, with each unique pose defining the location and orientation of the robotic manipulator in the workspace.

Path planning comprises, for example, global path planning and local path planning. Global path planning takes a high-level view of the entire environment and computes a complete path from start to goal, considering all known static obstacles and constraints. It typically works with a full map of the environment and produces an overall strategic route. Local path planning, also sometimes referred to as reactive planning, focuses on immediate robot motion, considering real-time sensor data about the nearby environment. Thus, local path planning provides local adjustments to the global path, to account for real-time situations, such as dynamic objects intruding or projected to intrude on the global path. Because local path changes may invalidate the current global path, local path changes may trigger re-computation of the global path.

As a general proposition, path planning involves potentially burdensome numerical processing, with the complexity varying in dependence on several factors, such as the DoF of the subject robotic manipulator, the nature of the environment—whether and to what extent dynamic objects may be present in the workspace—and the nature of the goal. Particular challenges for efficient path planning arise in scenarios where at least a portion of the space separating a starting pose from a goal pose is unseen. Here, "sensing" refers to scanning or viewing space for obstacle detection, and "unseen" refers to space that has never been sensed or has not been sensed recently enough to rely on the corresponding sensor data.

SUMMARY

Disclosed methods and apparatuses provide an advantageous approach to path planning for moving a robotic manipulator from a starting pose to a goal pose, in cases where the goal pose is within unseen space or advancing the robotic manipulator to the goal pose requires movement through or in unseen space. A particular aspect of the approach is the use of an exploration procedure for efficiently exposing unseen space, for advancing the robotic manipulator to the goal pose. The efficiency comes, in part, from estimating the swept volume of the robot when moving through the unseen space along an idealized path towards the goal pose, in coordination with executing a strategy for efficiently exposing that path via one or more sensors.

An example embodiment comprises a method of path planning for movement of a robotic manipulator from a starting pose to a goal pose within a configuration space of the robotic manipulator. The method includes planning an overall path for the robotic manipulator to move from the starting pose to the goal pose, wherein at least a portion of the overall path overlaps with unseen space within the configuration space and comprises a hypothesized path determined in dependence on treating the unseen space as unoccupied. The method further includes estimating an interest region as that volume within the unseen space that would be swept by the robotic manipulator while traversing along the hypothesized path. Still further, the method includes incrementally sensing the interest region for object detection and corresponding responsive modification of the hypothesized path, according to a path exposure procedure.

The path exposure procedure includes determining a next sensor pose for sensing a next portion of the interest region via a sensor associated with the robotic manipulator. Based on that sensing detecting no obstacles in the next portion of the interest region and there being remaining interest region to sense, processing advances to a next repetition of the path exposure procedure. Alternatively, based on that sensing detecting one or more obstacles—i.e., one or more collision risks are detected—processing continues with updating the hypothesized path for avoidance of the detected one or more obstacles and correspondingly updating the interest region, and then advancing to a next repetition of the path exposure procedure.

A related example embodiment comprises a computer apparatus configured to perform path planning for movement of a robotic manipulator from a starting pose to a goal pose within a configuration space of the robotic manipulator. The computer apparatus includes interface circuitry and processing circuitry.

The processing circuitry is configured to plan an overall path for the robotic manipulator to move from the starting pose to the goal pose, wherein at least a portion of the overall path overlaps with unseen space within the configuration space and comprises a hypothesized path determined in dependence on treating the unseen space as unoccupied. Further, the processing circuitry is configured to estimate an interest region as that volume within the unseen space that would be swept by the robotic manipulator while traversing along the hypothesized path.

Still further, the processing circuitry is configured to incrementally sense the interest region for object detection and perform corresponding responsive modification of the hypothesized path, according to a path exposure procedure. According to that procedure, the processing circuitry determines a next sensor pose for sensing a next portion of the interest region via a sensor associated with the robotic manipulator. The processing circuitry is then configured to take selective next actions in dependence on whether sensing the next portion of the interest region indicates or does not indicate collision risks. Responsive to detecting no obstacles in the next portion of the interest region and there being remaining interest region to sense, the processing circuitry advances its logical processing to a next repetition of the path exposure procedure. Conversely, responsive to detecting one or more obstacles in the next portion of the interest region, the processing circuitry updates the hypothesized path for avoidance of the detected one or more obstacles and correspondingly updates the interest region and then advances to a next repetition of the path exposure procedure.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
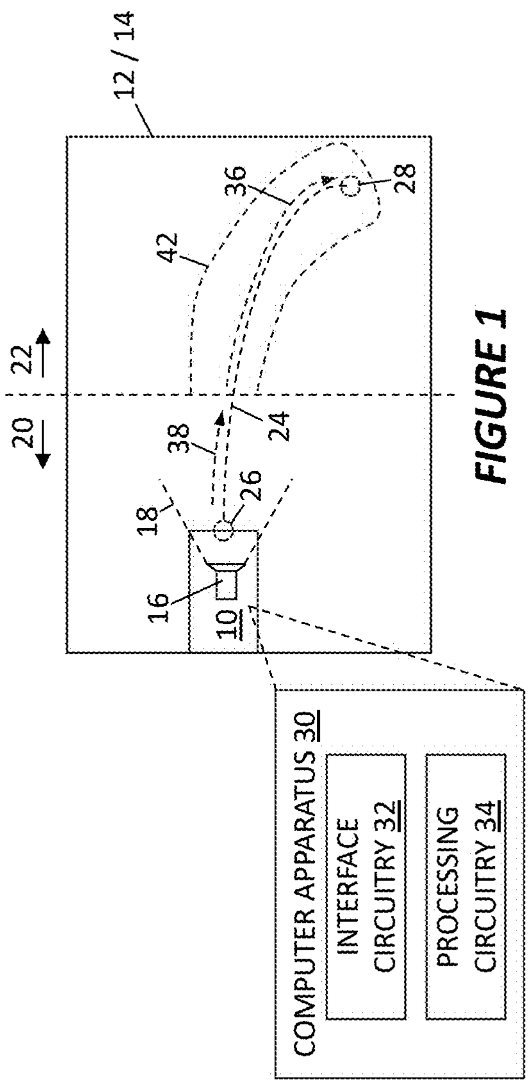
FIG. 1 is a block diagram of a robotic manipulator and an associated computer apparatus, according to example embodiments.

FIG. 1 illustrates a robotic manipulator 10 according to an example embodiment, with the depiction simplified in the sense that details of the robotic manipulator 10, such as its possible inclusion of articulated links, are not shown. Operation of the robotic manipulator 10 involves its movement within a configuration space 12, which corresponds with a workspace 14 of the robotic manipulator. Here, the configuration space 12 accounts for movement constraints of the robotic manipulator 10, such as limits on joint angles, or the like, whereas the workspace 14 may be understood as a continuous 3D space represented in Cartesian coordinates.

One or more sensors 16 provide sensing of the workspace 14, for obstacle detection. In cases where there are two or more sensors 16, they may or may not be of the same sensor type, with example sensor types including cameras for vision-based sensing, ultrasonic sensors for acoustic sensing, light-based detection and ranging (LIDAR) units for LIDAR scanning, etc. For any particular position and orientation within the workspace 14, each sensor 16 has a corresponding sensing field of view (FoV) 18.

The FoV 18 of any given sensor 16 may, at any given point in time, encompass less than all the workspace 14, because of its location and orientation within the workspace 14 (its "pose"), in combination with sensing angle limitations, sensing distance limitations, or the like. Even in scenarios where a given sensor 16 technically is capable of simultaneously sensing the entire workspace 14, occlusions ("shadowing") caused either by the robotic manipulator 10 or other items in its FoV 18, may prevent the given sensor 16 from "seeing" the entire workspace 14.

Indeed, even where multiple sensors 16 provide object detection data—sensing data—for planning movement of the robotic manipulator 10, there may be times at which one or more portions of the workspace 14 are seen and one or more portions are not. FIG. 1 indicates such a scenario in simplified form, where one portion of the workspace 14 is seen space 20 according to current sensor data—the most recently captured sensor data—from the one or more sensors 16, and where the remaining portion of the workspace 14 is unseen space 22.

Note that to the extent that the seen and unseen spaces 20 and 22 do not correspond precisely with the example sensor depiction, it shall be understood that FIG. 1 provides a simplified view for discussion—the seen and unseen spaces 20 and 22 may or may not be contiguous and, as a general proposition, may change over time. In the particular context of FIG. 1, there may be, for example, one or more static sensors not shown that at least partially define the seen space, with the sensor 16 shown onboard the robotic manipulator 10 further defining the seen space 20, albeit with variation in dependence on its pose.

As a general proposition, one or more sensors 16 that move in association with movement of the robotic manipulator 10 are assumed. The portion of the overall workspace 14 that is seen by each such sensor changes with changing poses of the robotic manipulator 10 and/or with articulation of such sensors 16. For example, a sensor 16 may be mounted such that it can tilt or pan over a limited range. However, as noted above, there may be one or more additional sensors 16, such as one or more sensors 16 mounted offboard the robotic manipulator 10, for sensing at least some of the workspace 14.

In any case, at any given point in time, the workspace 14 may include one or more seen spaces 20 and one or more unseen spaces 22. In one or more embodiments, sensor data capture from the one or more sensors 16 occurs periodically, with the most recent sensor data capture for any given sensor 16 defining what is considered to be seen space 20 with respect to that sensor 16. In this regard, the seen space 20 defined by one sensor data capture for the given sensor 16 may or may not be the same as the seen space 20 defined by the next or a later sensor data capture for the given sensor 16.

In this regard, the unseen space 22 may be classified into two categories: never seen space and previously seen space. Further, previously seen space may be reverted in a logical sense back to never seen space, e.g., according to an aging process that reclassifies any previously seen space older than a certain value back into never seen space. One differentiator between previously seen space and never seen space is that occupancy information is available for the previously seen space, as derived from the sensor data capture that defined the previously seen space. Thus, the reversion of previously seen space into never seen space can be understood as a mechanism for purging occupancy information once it becomes "stale."

Path planning for movement of the robotic manipulator 10 within the workspace 14 may be challenging, particularly in cases where at least a portion of an overall path 24 for the robotic manipulator 10 to move from a starting pose 26 to a goal pose 28 overlaps with unseen space 22. Advantageously, the robotic manipulator 10 includes or is communicatively coupled with a computer apparatus 30 that is operative to efficiently handle unseen spaces 20 in the context of path planning.

In particular, in an example embodiment, the computer apparatus 30 is configured to perform path planning for movement of the robotic manipulator 10 from a given starting pose 26 to a given goal pose 28 within the configuration space 12 of the robotic manipulator 10. For such operation, the processing circuitry 34 is configured to plan an overall path 24 for the robotic manipulator 10 to move from the starting pose 26 to the goal pose 28. At least a portion of the overall path 24 overlaps with unseen space 22 within the configuration space 12 and comprises a hypothesized path 36 determined in dependence on treating the unseen space 22 as unoccupied.

In other words, the overall path 24 includes one or more portions that are referred to as the "hypothesized path," to denote the fact that these portion(s) exist in unseen space 22. There may be one or more remaining portions of the overall path 24 that exist in seen space 20, meaning that such portion(s) are computed based on occupancy information derived from the current sensor data, and they may be referred to as the "known path." In FIG. 1, then, the overall path 24 includes a known path 38 determined based on current occupancy information and a hypothesized path 36 determined based on the assumption that there are no interfering obstacles in the unseen space 22. Among its various advantages, the behavior of the path-planning by the computer apparatus 30 advantageously addresses instances where there are interfering obstacles.

With respect to the overall path 24, the processing circuitry 34 is configured to estimate an interest region 42 as that volume within the unseen space 22 that would be swept by the robotic manipulator 10 while traversing along the hypothesized path 36. Further, the processing circuitry 34 is configured to incrementally sense the interest region 42 for object detection and corresponding responsive modification of the hypothesized path 36, according to a path exposure procedure.

That procedure comprises determining a next sensor pose for sensing a next portion of the interest region 42 via a sensor 16 associated with the robotic manipulator 10 and, responsive to detecting no obstacles in the next portion of the interest region 42 and there being remaining interest region 42 to sense, advancing to a next repetition of the path exposure procedure; or, responsive to detecting one or more obstacles in the next portion of the interest region 42, updating the hypothesized path 36 for avoidance of the detected one or more obstacles and correspondingly updating the interest region 42, and then advancing to a next repetition of the path exposure procedure.

In simple terms, in one or more embodiments, the computer apparatus 30 is configured to control the movement of one or more sensors 16, for exposing or uncovering the interest region 42 in an efficient manner. Here, "uncovering" or "exposing" the interest region 42 should be understood as meaning the incremental sensing of the interest region 42, either to confirm that the next portion of the interest region 42 is clear of obstacles, or to detect any interference obstacles, for responsive modification of the hypothesized path 36, corresponding to re-estimation of the interest region 42 to account for the path modification(s).

In at least one embodiment, for updating the hypothesized path 36 for avoidance of one or more detected obstacles and for correspondingly updating the interest region 42, the processing circuitry 34 is configured to update the hypothesized path 36 according to a new hypothesis that avoids the detected one or more obstacles and treats a remaining portion of the unseen space 22 as unoccupied; and update the interest region 42 according to the new hypothesis.

In at least one embodiment, at least one of the one or more of the sensors 16 used for incrementally uncovering the interest region 42 along the hypothesized path 36 is mounted on the robotic manipulator 10. Such a sensor 16 may be fixedly mounted to the robotic manipulator 10, such that moving the sensor 16 requires moving the robotic manipulator 10. In one or more embodiments, however, a sensor 16 is movably mounted on or carried with the robotic manipulator 10, such that it may be moved in one or more degrees of freedom independent of movement of the robotic manipulator 10, with additional or alternate degrees of movement freedom available for the sensor 16 via movement of the robotic manipulator 10.

In one or more embodiments, the processing circuitry 34 is configured to determine the hypothesized path 24 as a nominal path that is based on an assumption of no interfering obstacles in the interest region 42. Thus, "nominal" refers to how the robotic manipulator 10 would be moved in a normal case, where the space in question was seen and confirmed to be free of interfering obstacles. Along those lines, for any portion of the overall path 24 that overlaps with seen space 20 within the configuration space 12 for which occupancy is known, the processing circuitry 34 is configured to account for the known occupancy with respect to planning the overall path 24.

For planning the overall path 24, the processing circuitry 34 in one or more embodiments is configured to receive application information regarding one or more tasks to be performed by the robotic manipulator 10 and determine the goal pose 28 from the application information. As one example, the computer apparatus 30 is onboard the robotic manipulator 10 and forms part of or is coupled with application-processing circuitry that runs one or more embedded applications that prescribe one or more tasks to be performed by the robotic manipulator 10. In at least one such embodiment, the processing circuitry 34 interfaces with host-processing circuitry onboard the robotic manipulator 10 via a data/signaling bus provided by the interface circuitry 32. In one or more other embodiments, the computer apparatus 30 is offboard the robotic manipulator 10 and is included in, or coupled with, a computer server that executes application software for the robotic manipulator 10 and provides corresponding control signaling thereto.

In one or more embodiments, the robotic manipulator 10 comprises a robotic arm. In at least one such embodiment, the robotic manipulator 10 comprises a robotic arm mounted on a movable base, and, with respect to planning the overall path for the robotic manipulator 10, the processing circuitry 34 is configured to account for one or both of movement of the robotic arm and movement of the movable base.

In the context of the path exposure procedure, for determining the next sensor pose for sensing the next portion of the interest region 42, the processing circuitry 34 in one or more embodiments is configured to, for each of two or more candidate next sensor poses, determine a corresponding next portion of the interest region 42 that would be exposed, rank the corresponding next portions of the interest region 42 in terms of one or more ranking metrics, and choose the next sensor pose as a highest ranked one of the candidate next sensor poses. For example, wherein the one or more ranking metrics comprise any one or more of: a volume metric, a goal distance metric, an orientation-constraint metric, or a manipulability metric.

Such ranking operations can be understood as deciding which candidate sensor pose yields the most useful or valuable information about the remaining unseen portion of the interest region 42. Identifying the best candidate sensor pose at each repetition of the path exposure procedure can be understood as an optimization or efficiency-enhancing process that reduces the amount of sensing or exploration of the unseen space that is needed to find a clear path to the goal pose 28.

As noted, an example sensor 16 used for carrying out repetitions of the path exploration procedure may be a camera having a defined field of view, where the next most strategic sensor pose is a selected camera pose, and where different camera poses provide different positions and orientations of the camera for sensing different portions of the configuration space 12. In at least one embodiment, the camera is movably mounted on a link of the robotic manipulator 10, such that any particular camera pose depends on at least one of: movement of the robotic manipulator 10 within the configuration space 12, or movement of the camera relative to the link.

In one or more embodiments, the processing circuitry 34 is further configured to advance the robotic manipulator 10 within the configuration space 12, in conjunction with incrementally visualizing the interest region 42. That is, as the computer apparatus 30 incrementally uncovers successive portions of the interest region 42, the computer apparatus 30 incrementally advances the robotic manipulator 10. For example, the processing circuitry 34 generates motor control signals via the interface circuitry 32, for controlling one or more drive motors onboard the robotic manipulator 10.

Figure 2:
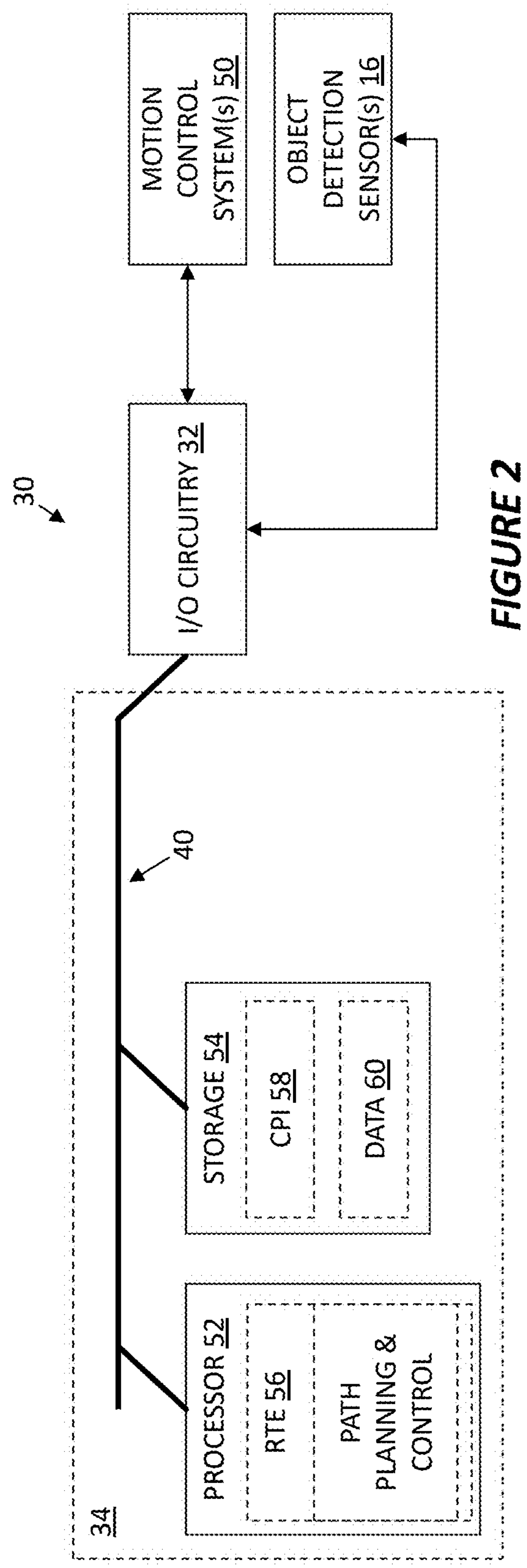
FIG. 2 is a block diagram of example details for the computer apparatus.

FIG. 2 offers example details for the computer apparatus 30 in an onboard variant, where the computer apparatus 30 includes the processing circuitry 34 and the associated interface circuitry 32 (also referred to as "I/O circuitry 32"). The interface circuitry 32 couples the processing circuitry 34 with one or more object detection sensors 16, and with one or more motion control systems 50 of the robotic manipulator 10. The motion control system(s) 50 are also referred to as a "motion actuation system" and include, in at least one embodiment, one or more drive motors for movement control of the robotic manipulator 10, with the processing circuitry 34 configured to output actuator control signals for corresponding control of the motion control system(s) 50.

The processing circuitry 34 in an example embodiment comprises a processor 52 and associated storage 54. The processor 52 comprises, for example, one or more microprocessors, microcontrollers, digital signal processors, or other digital processing circuitry, such as one or more Field Programmable Gate Arrays (FPGAs) or Application Specific Integrated Circuits (ASICs) that implement a programmable digital processor. In at least one example, the processor 52 provides a runtime environment 56 for the execution of one or more computer programs. In at least one embodiment, the storage 54 comprises one or more types of computer readable media, such as a mix of volatile and non-volatile memories.

The storage 54 contains computer program instructions (CPI) 58, the execution of which by the processor 52 configures—specially adapts—the processor 52 to carry out the method(s) described herein for path planning of the robotic manipulator 10. In at least one such example, the CPI 58 constitute a dynamic path planning and control program that is executed by the processor 52. The storage 54 in one or more embodiments also stores data 60, where the data 60 comprises configuration data (provisioned data) and/or operational data—working data—determined on the fly, as part of live program execution.

Figure 3:
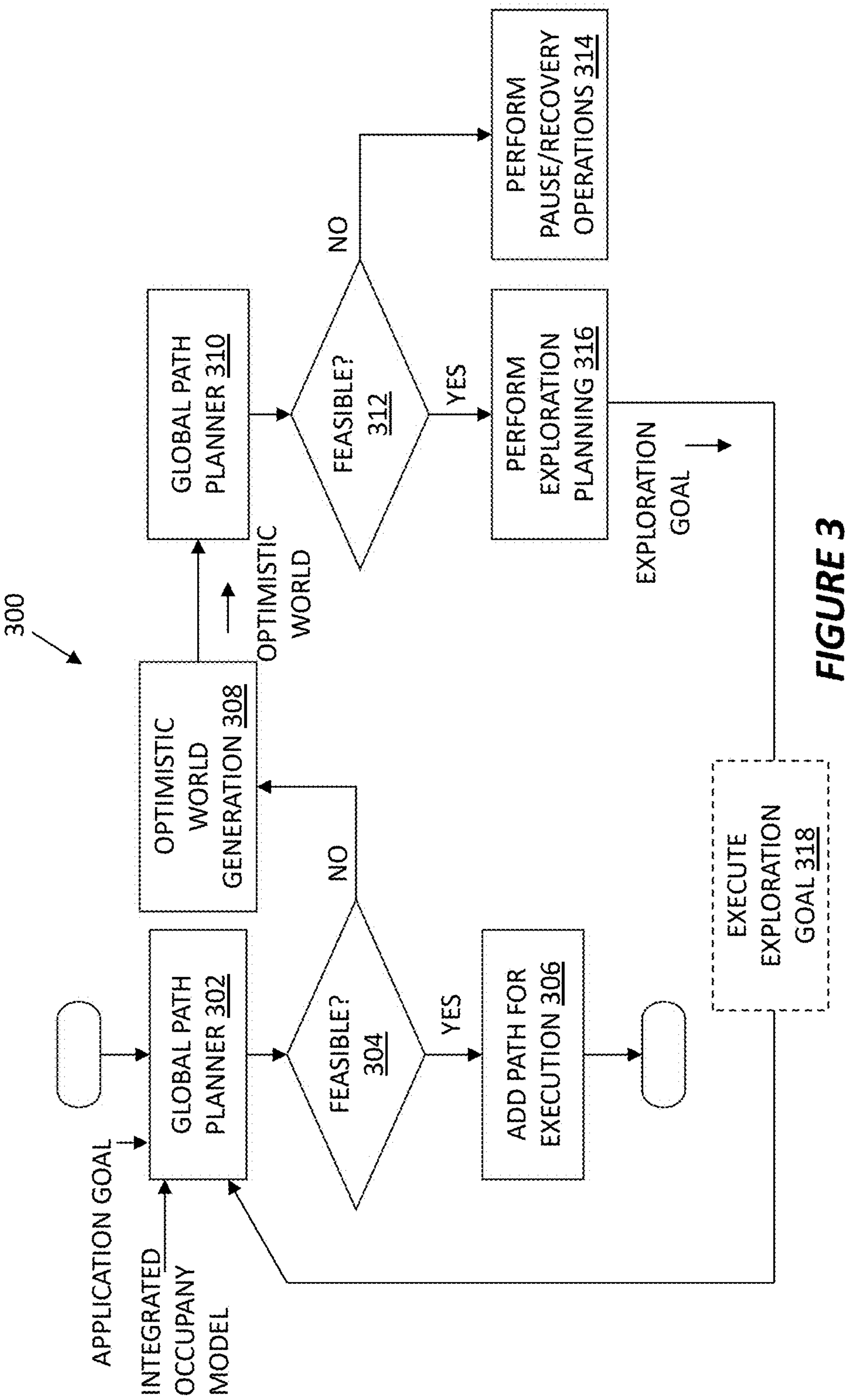
FIG. 3 is a logic flow diagram of a method of path planning for a robotic manipulator, according to an example embodiment.

FIG. 3 is a logic flow diagram illustrating an example method 300 of path planning for movement of a robotic manipulator 10 from a starting pose 26 to a goal pose 28 within a configuration space 12 of the robotic manipulator 10. For example, the computer apparatus 30 carries out the method 300 based on execution of stored CPI 58, such as shown in FIG. 2. Of course, implementation of the method 300 is not limited to the example processing arrangement of FIG. 2.

In understanding the method 300, a path is "feasible" if it is collision free, i.e. it has no intersection with occupied space. The term "optimistic world" in the figure refers to the logical treatment or classification of never seen space 22 as being free of any obstacles. Further, the term "exploration planning" corresponds with the path exposure procedure described above, for incrementally uncovering or exposing the never seen space 22 in a manner that reduces the amount of never seen space 22 that must be explored for path planning to the goal pose 28.

The example processing begins with determining the application goal 28 and obtaining "integrated occupancy model" information, which is based on occupancy determinations made for the seen space 20. The application goal 28 may be learned by, for example, receiving signaling from an application-layer process related to carrying out an intended task of the robotic manipulator 10.

The application goal 28 may be expressed as a particular pose of the robotic manipulator 10 within the configuration space 12. Any particular pose defines the location and orientation of all portions of the robotic manipulator 10 in the workspace 14, and may be represented as a configuration vector, e.g., CV={val1, val2, val3, . . . , valn}. Here, each value ("val") represents a joint angle or other actuator position, with the combination of values completely defining the pose of the robotic manipulator 10. There are as many vector elements in CV as there are DoF of the robotic manipulator 10, with the possible values of each vector element dictated by physical constraints.

In any case, the processing logic labeled "Global Path Planner" (Block 302) attempts to find a path to its current goal. For example, the Global Path Planner may maintain a stack of goals. On this initial or starting run, the stack of goals initially consists of just the application goal 28. The global path planner uses the integrated occupancy model to generate this initial path based on treating the never seen space 22 as being wholly occupied.

As a consequence of treating the never seen space 22 as being occupied, the path feasibility determination will fail ("No" from Block 304) if no feasible path to the application goal 28 exists wholly within the seen space 20. If a feasible path within the seen space 20 exists, the initially planned global path is passed along for execution ("Yes" from Block 304 into Block 306), otherwise, processing passes to Block 308, which comprises optimistic world generation.

Optimistic world generation refers to the logical treatment of the never seen space 22 as being unoccupied. This optimistic world view is passed to the global path planner 310, which determines whether a feasible path to the application goal 28 exists in light of the occupancy information known for the seen space 20 and the optimistic assumption that the never seen space 22 is unoccupied. If no feasible path exists even with this optimistic world view ("No" from Block 312 into Block 314), pause and recovery operations are performed, which can be understood as exiting from the flow of the method 300, for special recovery operations not germane to the example details of the path exposure procedure at issue in the method 300.

Thus, assuming that the global path planner 310 determines that a feasible path to the application goal 28 exists in light of the optimistic world view, processing continues with performing exploration planning (Block 316). Exploration planning refers to the portion of the path exploration procedure in which a next exploration goal is determined, with the objective of collecting more information about the world along the path determined in dependence on the optimistic world view.

Relating these operations back to FIG. 1 momentarily, the global path planner 302 would obtain the application goal 28 and the integrated occupancy model, and it would determine that no paths are feasible, as a consequence of the application goal 28 residing in unseen space 22. Thus, processing would initially pass to the optimistic world generation of block 308, and then onto the global path planner 310. Now, based on the assumption that the unseen space 22 is unoccupied, the global path planner 310 would, for example, generate the overall path 24 shown in FIG. 1, where the overall path 24 includes a hypothesized path 36 through the unseen space 22 to the application goal 28 that is based on the assumption that such a path is free of collision risks.

Thus, at that point, in this first run through the logic flow of the method 300, the exploration planning in Block 316 aims for identifying the most strategic first exploration goal for exposing the interest region 42—i.e., the volume of space along the hypothesized path 36 that would be swept by the robotic manipulator 10 if it was moved into the unseen space 22 along the hypothesized path 36.

This first exploration goal is executed (Block 318) and processing returns to the global path planner 302, which determines whether the newly exposed region of unseen space 22 provides a feasible path to the application goal 28. Logically, in one or more embodiments, exploration-goal execution may be considered as part of the global path planner 302, such that the processing flow back to the global path planner 302 includes incremental exposure of the interest region 42.

In any case, if the newly exposed region of unseen space 22 provides a feasible path to the application goal 28, the global path planner 302 plans the path and adds it for execution (Block 306). If not, processing passes back to optimistic world generation (Block 308) where the never seen space 22—now minus the portion exposed using the first exploration goal—is assumed to be free of collision risks, and the global path planner 310 either determines that there is no feasible path to the application goal 28, or it adapts the hypothesized path 36, as needed, to account for any newly determined collision risks, and exploration planning is repeated—i.e., a next sensor pose is determined for strategic incremental exposure of the interest region 42 along the hypothetical path 36.

Notably, realizing any given exploration goal may or may not require movement of the robotic manipulator 10 itself, in dependence on the whether the sensor(s) 16 can be manipulated without movement of the robotic manipulator 10, to achieve the sensor pose defined as the exploration goal. In cases where the involved sensor(s) 16 are mounted on the robotic manipulator 10, movement of the robotic manipulator 10 is more likely to be required.

The repeated path exposure processing represented in the method 300 stops when the global path planner 302 finds a path to the application goal 28 without need for invoking a further round of optimistic world generation, or when finding a path to the application goal 28 is deemed to be currently infeasible (as obstacles in the world are discovered with exploration), or responsive to the occurrence of a process timeout, with overarching processing logic then performing a "fresh" retry of the method 300, based on clearing the existing stack of exploration goals and starting again with the application goal 28. This fresh retry reflects the fact that the environment may change as a consequence of dynamic obstacles, meaning that one or more feasible paths may become available.

Figure 4:
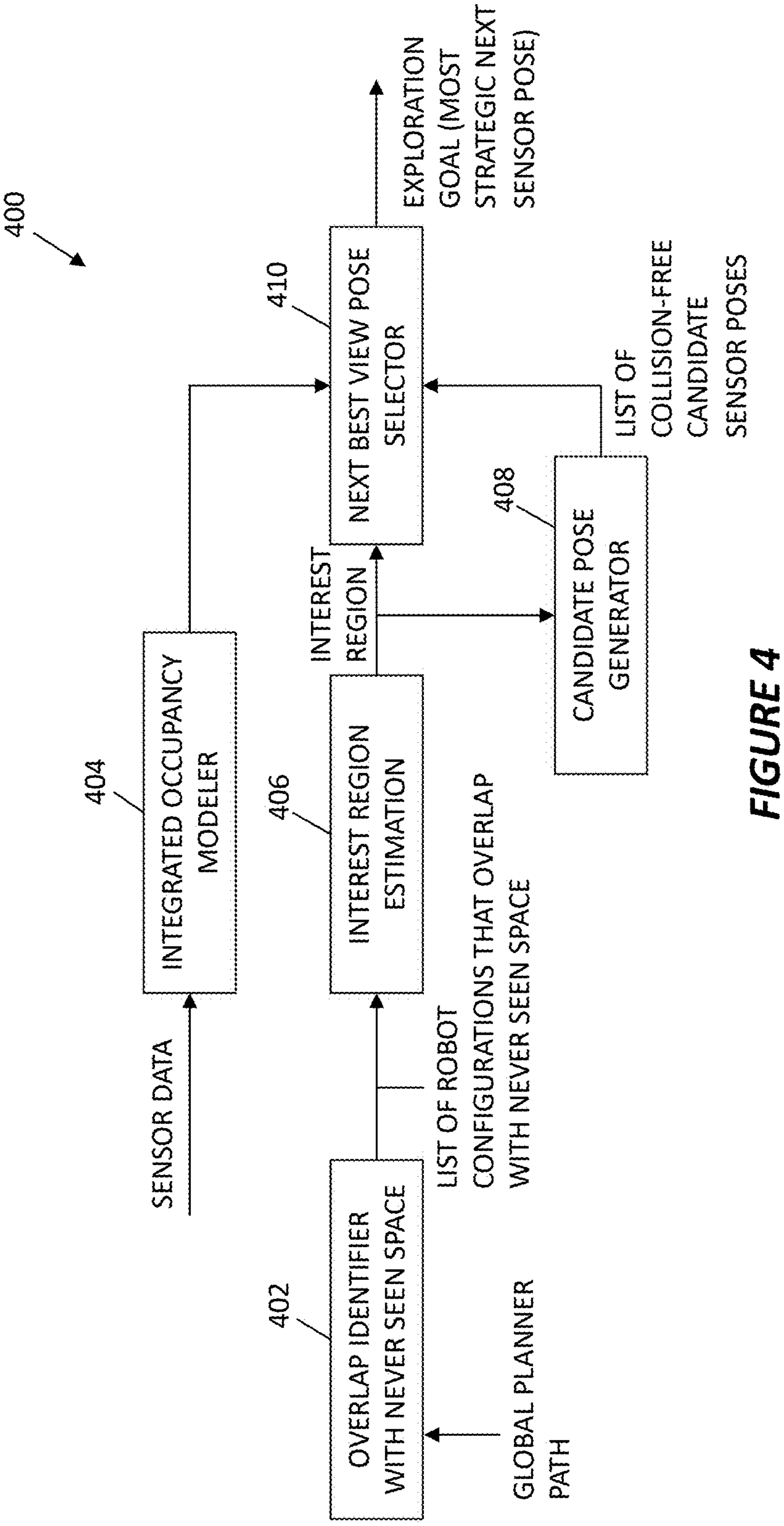
FIG. 4 is a logic flow diagram of operations included in a path exposure procedure for path planning, according to an example embodiment.

FIG. 4 illustrates example processing logic 400 for implementation of the exploration planning shown as Block 316 in FIG. 3. Processing logic 402 ("Overlap Identifier with Never Seen Space") computes all robot configurations along the global path input from global path planning that overlap with the never seen space 22. The output is a corresponding list. Such processing provides a basis for estimating the interest region 42.

Processing logic 404 ("Integrated Occupancy Modeler") is responsible for generating an integrated occupancy model of the environment based on sensor data from the one or more sensors 16 used for sensing obstacles within the configuration space 12/workspace 14.

Processing logic 406 ("Interest Region Estimation") computes the interest region 42 based on the list of robot configurations that overlap with never seen space 22 and the integrated occupancy information. The interest region 42 can be understood as that portion of the never seen space 22 for which occupancy information is needed.

Example steps for interest region estimation include: (1) take as input the robot poses that overlap with never seen space 22; (2) take as input the robot collision model; and (3) compute the space where information is needed. With momentary reference back to FIG. 1, the space where occupancy information is needed is that volume of never seen space 22 that would be swept by the robot moving along the hypothesized path 36. In this context, the "robot collision model" refers to a geometric or CAD model of the robot structure, which allows determining the actual space that the robotic manipulator 10 occupies when it is in a particular configuration (pose).

Processing logic 408 ("Candidate Pose Generator") operates based on the interest region information from the interest region estimation block. The candidate pose generator generates potential sensor poses that can potentially increase information inside the interest region 42. The sensor poses generated are checked for collisions and only collision-free poses are stored in the list of potential sensor poses. With respect to a robot-mounted sensor 16, each sensor pose subsumes a robot pose, although a number of sensor poses for any given robot pose may be possible, in dependence on how the sensor 16 is articulated.

An example method to generate candidate poses is to random sample a predefined number of poses that are "near" the interest region 42. In an example case where the sensor (s) 16 in question comprise a camera, nearness to the interest region 42 can be defined based on the camera optical axis and the centroid of the interest region 42.

Processing logic 410 ("Next Best View Pose Selector") operates based on information from the interest region estimation block and the camera pose list from the camera pose generator block. The processing logic 410 finds the sensor pose that has the highest performance with respect to a metric derived from the sensor pose. The metric chosen is such that it positively correlates with incremental volume of interest region 42 uncovered by the sensor 16 at a given pose. For example, the metric may be "information gain," such that the highest performance one among a list of sensor poses that are candidates for incremental exposure of the interest region 42 is the one that will yield the greatest information gain. This can be understood as an example of determining a next sensor pose for sensing-exposing-a next portion of the interest region 42 via a sensor associated with the robotic manipulator 10.

Advantageous aspects of operation that flow from the operations described with respect to FIGS. 3 and 4 include: (1) a method to identify target regions of space that need to be uncovered based on planning-related goals; (2) a method to plan motions of a movable sensor or sensors to collect data about identified targeted regions of space; (3) a method to incrementally build a partial representation of the environment that is sufficient for a path planner; and (4) a method that iteratively plans paths using the incrementally-built, partial representations of the environment.

Figure 5A:
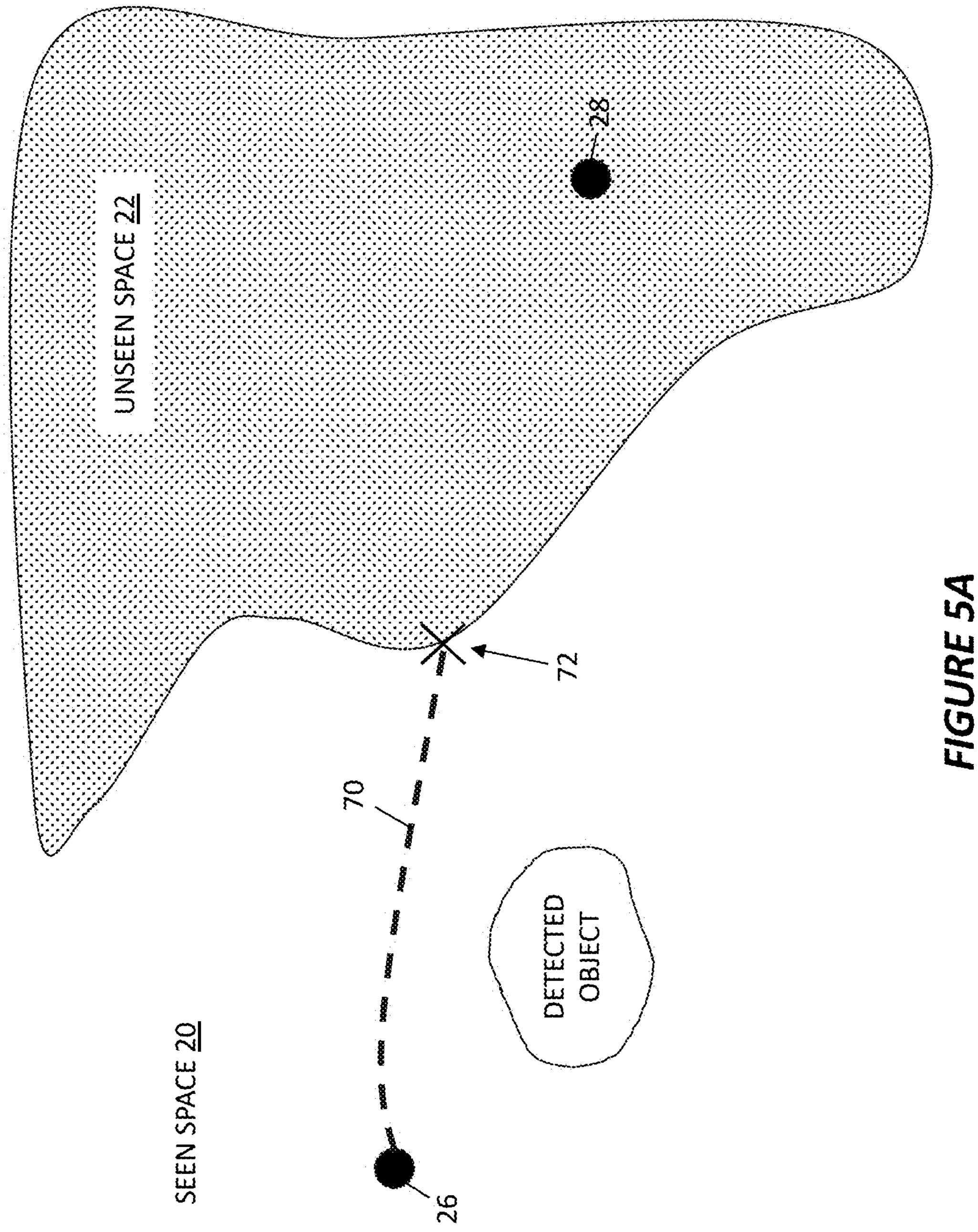
FIGS. 5A-5D are diagrams of path planning for a robotic manipulator, including execution of a path exposure procedure, according to an example embodiment.
Figure 5B:
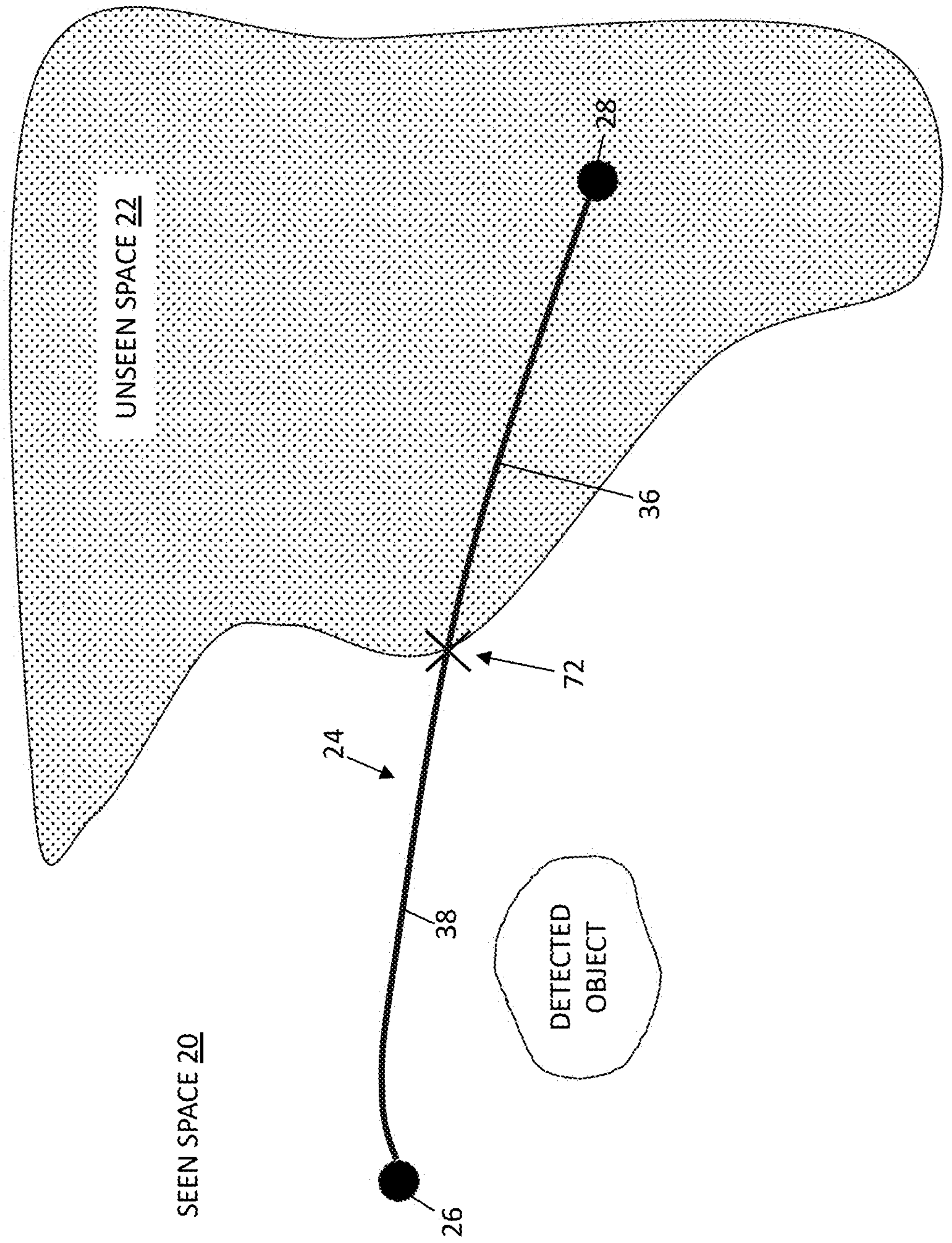

FIGS. 5A-5D offer further example details. FIG. 5A illustrates initial global path planning for moving a robotic manipulator 10 from a starting goal in seen space 20 to an application goal 28 in unseen space 22. For continuing clarity, the unseen space 22 is "known" in that it constitutes part of the configuration space 12 of the robotic manipulator 10, which means that every point in the configuration space 12 is a known configuration space vector CV for the robotic manipulator 10. However, the unseen space 22 is that portion or those portions of the configuration space 12 for which no usable sensor data is available for determining.

In FIG. 5A, initial global path planning begins planning a global path 70 from the starting pose 26 to a goal pose 28. See the first execution of the global path planner 302 in the context of FIG. 3. However, global path planning recognizes that the global path 70 intersects with never seen space 22—see intersection point 72 in the diagram. Notably, this initial global path 70 accounts for any detected objects in the seen space 20, including dynamic behavior and corresponding projections of collision risks. However, no occupancy data is available for the never seen space 22, meaning that initial global path planning fails. See the "No" path from Block 304 in FIG. 3.

This failure triggers optimistic world generation processing, which assumes the absence of collision risks in the never seen space 22, and that assumed absence then allows for the initial generation of an overall path 24 from the starting pose 26 to the goal pose 28. As described in FIG. 1, and as reiterated in FIG. 5B, this overall path 24 includes a hypothesized path 36 and a known path 38. The known path 38 exists in seen space 20 and is based on occupancy information obtained from current sensor data, whereas the hypothesized path 36 exists in never seen space 22 and is computed on the assumption of no collision risks.

Figure 5C:
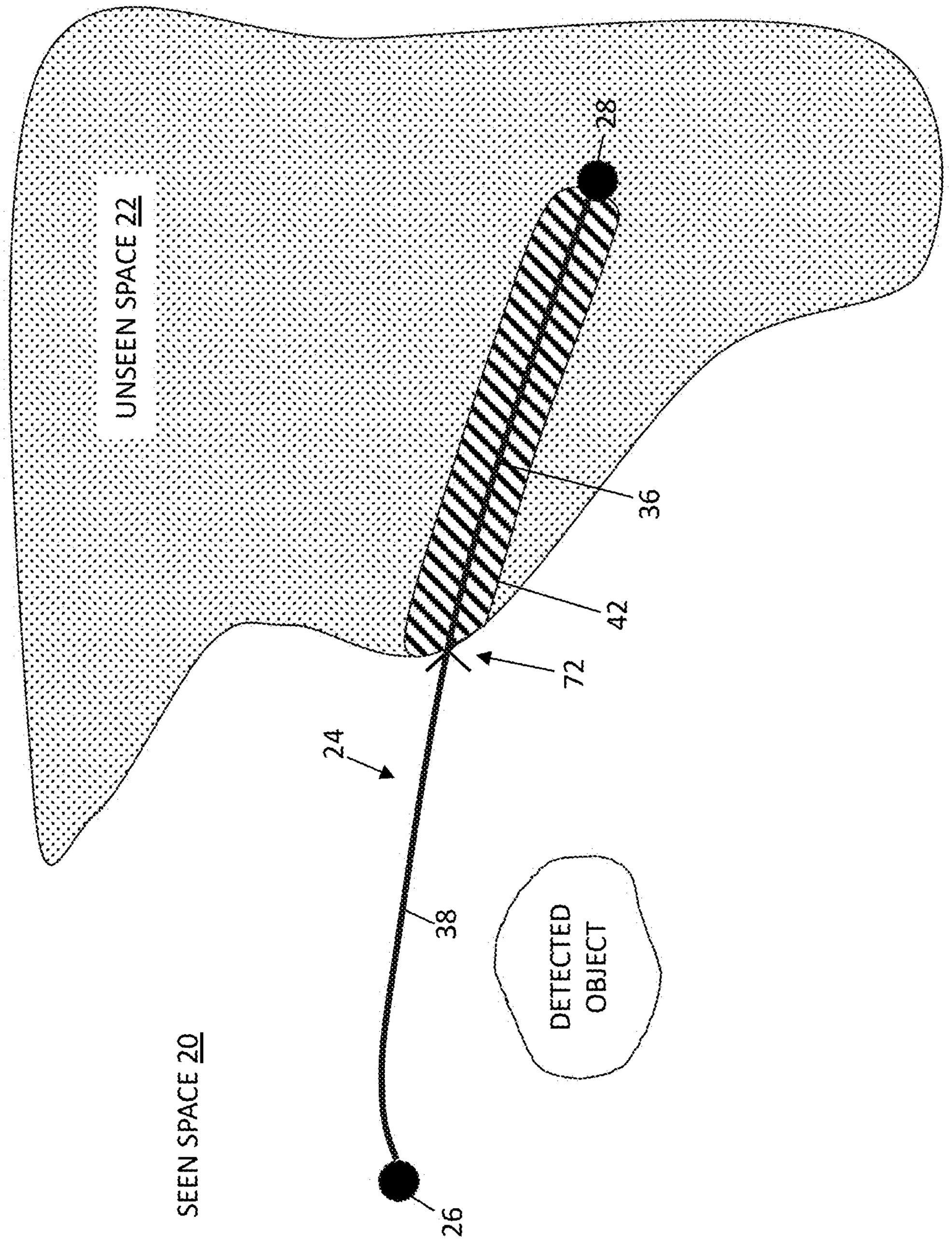

FIG. 5C illustrates estimation of the interest region 42 for the hypothesized path 36. As explained, the interest region 42 is the swept volume of the robotic manipulator, assuming it will be moved along the hypothesized path 36. The interest region 42 is not sensed yet—i.e., it is for now still never seen space 22—and the challenge lies on determining a most strategic approach for exposing the interest region 42, subject to one or more constraints, such as obstacles in the seen space 20, limitations on sensing ranges and fields of view, etc. For example, it may not be possible to fully expose the interest region 42 with a single strategic positioning of the involved sensor(s) 16. In such cases, the sensor(s) must be strategically positioned in incremental fashion, for exposure of the interest region 42.

Figure 5D:
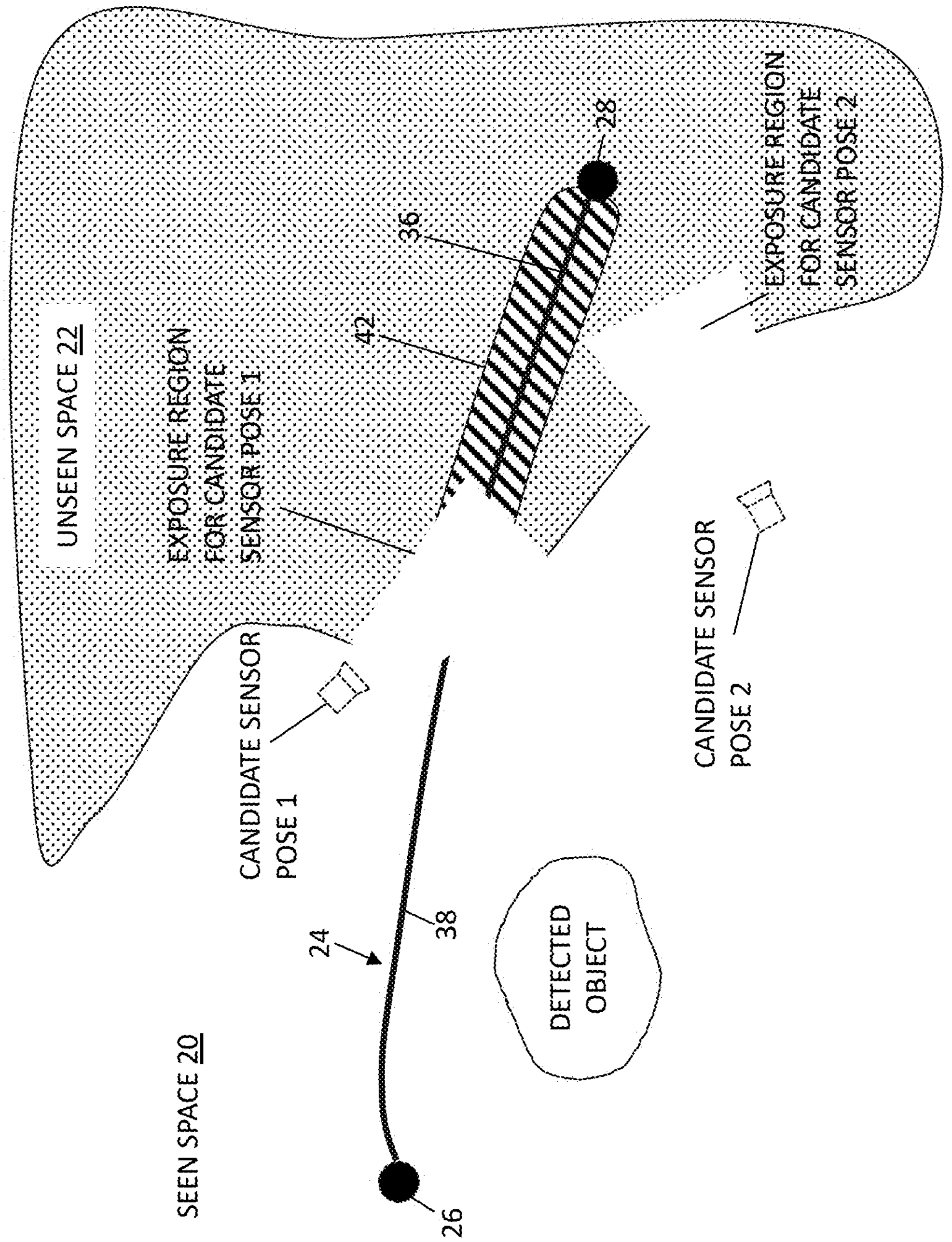

FIG. 5D illustrates example candidate poses (Pose 1 and Pose 2) that are possible based on the occupancy information known for the seen space 20. Note that the corresponding exposure regions associated with Pose 1 and Pose 2 can be calculated using stored sensor parameters, e.g., FoV, viewing angles, sensing range limits, etc. As such, without moving the involved sensor(s) 16 to each of these candidate poses, the computer apparatus 30 can compute the particular region of unseen space 22 that would be sensed for any given sensor pose. Note that the particulars of how a sensor pose is defined will depend on the manner in which the sensor 16 in question is movable. For example, is it mounted to the robotic manipulator 10 and, if so, does it have any degrees of movement independent of the robotic manipulator 10.

In any case, while FIG. 5D may be understood as offering an exaggerated case for easy comparison, Pose 1 is more strategic than Pose 2, given that Pose 1 exposes the entry point into the interest region 42, and a further amount of the interest region 42 along the hypothesized path 36. In comparison, Pose 2 exposes none of the interest region 42. Thus, Pose 1 may be selected and the necessary sensor and/or robotic manipulator movements commanded, to position the subject sensor at Pose 1, for acquisition of the sensing data shown as "Exposure Region for Pose 1" in the diagram.

Once that new sensor data is obtained and assuming that the goal pose 28 remains "hidden" in never seen space 22, processing continues with using the new sensor data to determine the next list or set of candidate poses, which are then compared for selection of the next one among them. New sensor data is obtained for this next selected pose, and the process repeats until the goal pose 28 is exposed or no feasible path to the goal pose 28 can be found. Note, too, that detection of collision risks along the hypothesized path 36 during this incremental exposure processing results in determining new candidate poses that allow for exploration of alternate paths, e.g., the computer apparatus 30 may adapt or otherwise change the hypothesized path 36 as it performs incremental exposure, to account for detected obstacles.

Overall, the behavior represented in FIGS. 5A-5D may be understood as a kind of logical and adaptive "tunneling" or "burrowing" through unseen space 22, to reach a goal pose 28. Such tunneling represent a minimal-exploration approach to resolving the problem of performing path planning when one or more regions of intervening unseen space are between the starting pose 26 and the goal pose 28.

Figure 6:
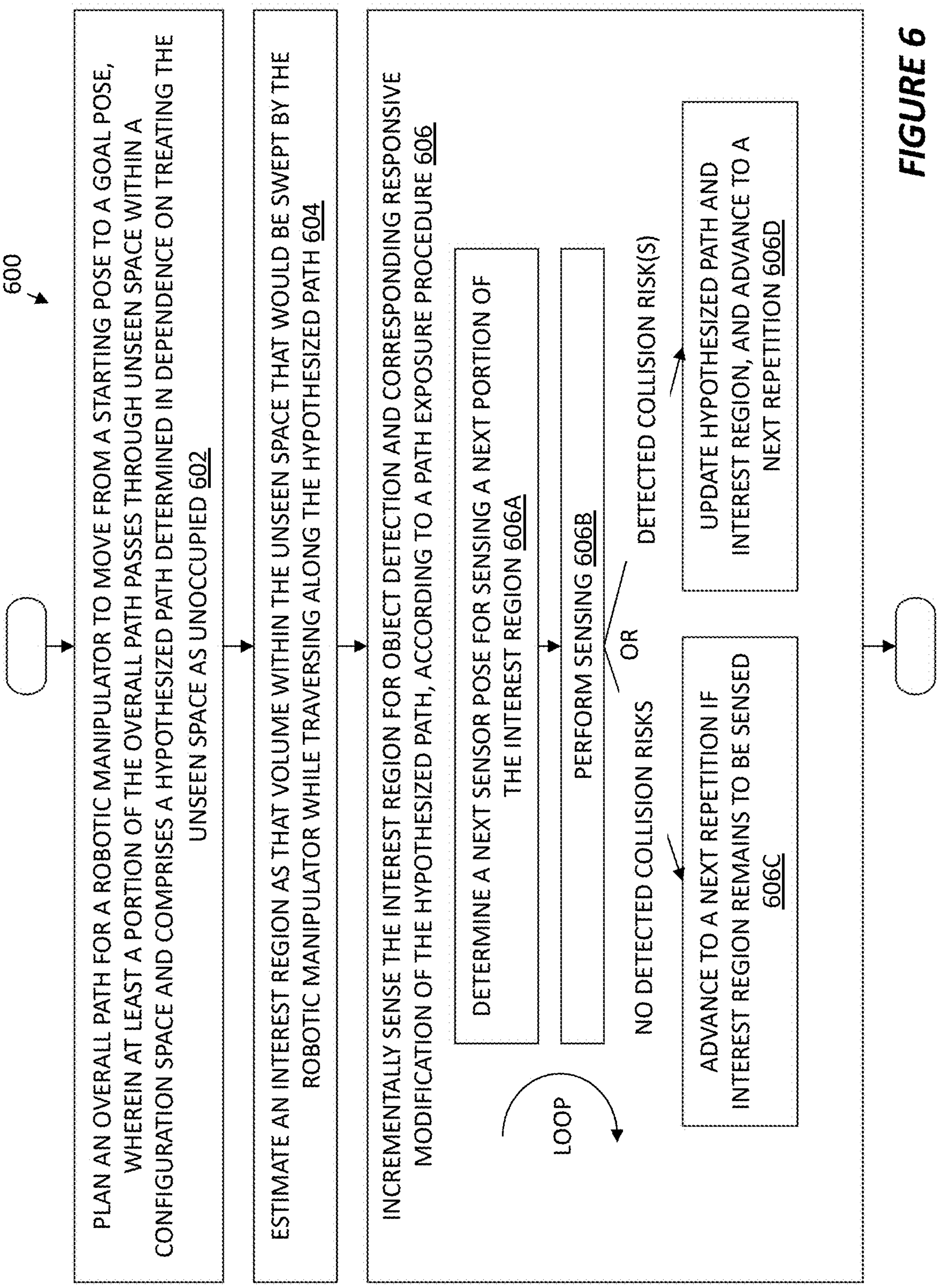
FIG. 6 is a logic flow diagram of a method of path planning for a robotic manipulator, according to another example embodiment.

FIG. 6 illustrates an overall method 600 of path planning for movement of a robotic manipulator 10 from a starting pose 26 to a goal pose 28 within a configuration space 12 of the robotic manipulator 10. The method 600 represents an example implementation of operational logic and behavior represented in FIGS. 3, 4, and 5A-5D.

The method 600 includes planning (Block 602) an overall path for the robotic manipulator 10 to move from the starting pose 26 to the goal pose 28, wherein at least a portion of the overall path overlaps with unseen space 22 within the configuration space 12 and comprises a hypothesized path 36 determined in dependence on treating the unseen space 22 as unoccupied.

Further, the method 600 includes estimating (Block 604) an interest region 42 as that volume within the unseen space 22 that would be swept by the robotic manipulator 10 while traversing along the hypothesized path 36 and incrementally sensing (Block 606) the interest region 42 for object detection and corresponding responsive modification of the hypothesized path 36, according to a path exposure procedure.

The path exposure procedure comprises determining (Block 606A) a next sensor pose for sensing a next portion of the interest region 42 via a sensor 16 associated with the robotic manipulator 10. Sensing is then performed for that next sensor pose (Block 606B), and responsive to detecting no obstacles in the next portion of the interest region 42 (i.e., no collision risks detected), and there being remaining interest region 42 to sense, processing advances (Block 606C) to a next repetition of the path exposure procedure (back to Block 606A). Otherwise, responsive to detecting one or more obstacles in the next portion of the interest region 42 (i.e., detecting one or more collision risks), processing advances from Block 606B to updating (Block 606D) the hypothesized path 36 for avoidance of the detected one or more obstacles and correspondingly updating the interest region 42, and then advancing to a next repetition of the path exposure procedure.

In one or more embodiments, the path exposure procedure includes, responsive to detecting no obstacles in the next portion of the interest region and there being no remaining interest region to sense, reverting to path planning according to known occupancies of corresponding seen space. For example, Block 606C may be understood as a decision-making block in which the processing circuitry carrying out the path exposure procedure processing determines whether a next repetition of the path exposure procedure is needed. In a case where the most current sensing via the path exposure procedure reveals the goal pose with no interfering objects, "normal" (known occupancy) path planning may be performed to the goal pose. Similarly, if the most current sensing via the path exposure procedure fully reveals the remaining interest region, e.g., back into seen space, then the path exposure procedure may be terminated and normal seen-space path planning may be used.

Of course, the looping shown in Block 606 may have one or more constraints not explicitly shown. For example, the Block-606 processing may be aborted after not finding any feasible way to advance through the unseen space 22 to the goal pose 28, or after reaching some overall limit on allowable repetitions of the loop, or some other timeout.

Such processing involves visiting intermediate exploration goals for the incremental exposure of the hypothesized path 36. In a "complete exploration" strategy, all intermediate exploration goals are identified and then executed in succession, allowing that the hypothesized path 36 is updated and the interest region 42 is re-estimated if collision risks are detected at any of the intermediate exploration goals. Alternatively, each intermediate exploration goal—each next sensor pose—can be executed, with the corresponding interest-region sensing used to determine whether a feasible path to the goal pose 28 has been exposed. If so, the remaining intermediate exploration goals are not executed, and the computer apparatus 30 finalizes global path planning to the goal pose 28. This approach may be termed as a "sufficient exploration" strategy.

In yet another variation, referred to as a "forgetful exploration" strategy, the computer apparatus 30 computes a complete set of intermediate exploration goals for exposing the goal pose 28, but computes a new set using the new sensor data acquired at each intermediate exploration goal. This can be understood as one approach for adapting to the new occupancy information gleaned each time sensing is performed at an intermediate exploration goal. While such an approach may at first seem computationally wasteful, it may have advantages in environments that change quickly.

Regardless of the particular variation used, substantive benefits are achieved with respect to a broad range of manipulators or mobile manipulators with in-system sensors, or with sensor FoV limitations or environment occlusions that can result in meaningful regions of the configuration space 12 being unseen at any given time. In at least some types of tasks—robot applications—unseen space may be unavoidable. For example, a robotic manipulator 10 may be required to insert and remove items from a centrifuge or other container, the interior of which may not be visible, at least not when the robotic manipulator 10 is at the starting pose 26. Absent the approach to path planning disclosed herein, path planning with respect to unseen space 22 may fail or may otherwise not properly account for collision risks.

The disclosed approach provides for collision free path planning with respect to goal poses 28 that are in unseen space 22 and with respect to circumstances where reaching the goal pose 28 requires the robotic manipulator 10 to move in or through unseen space 22, all while providing minimized exploration of the unseen space 22. Particular advantages may attend use of the disclosed approach with respect to robotic manipulators 10 that use only in-system sensors. An "in-system sensor" is any sensor 16 that is integrated with or considered to be part of an overall system that includes the robotic manipulator 10.

More broadly, the disclosed approach is advantageous for any robotic manipulator 10 that operates in a configuration space 12 where less than all of the configuration space 12 may be seen (sensed) at any given time. "Full" environmental coverage is not needed, and yet path planning remains responsive to dynamic environments, such as where humans are present or other robots are operating.

Figure 7A:
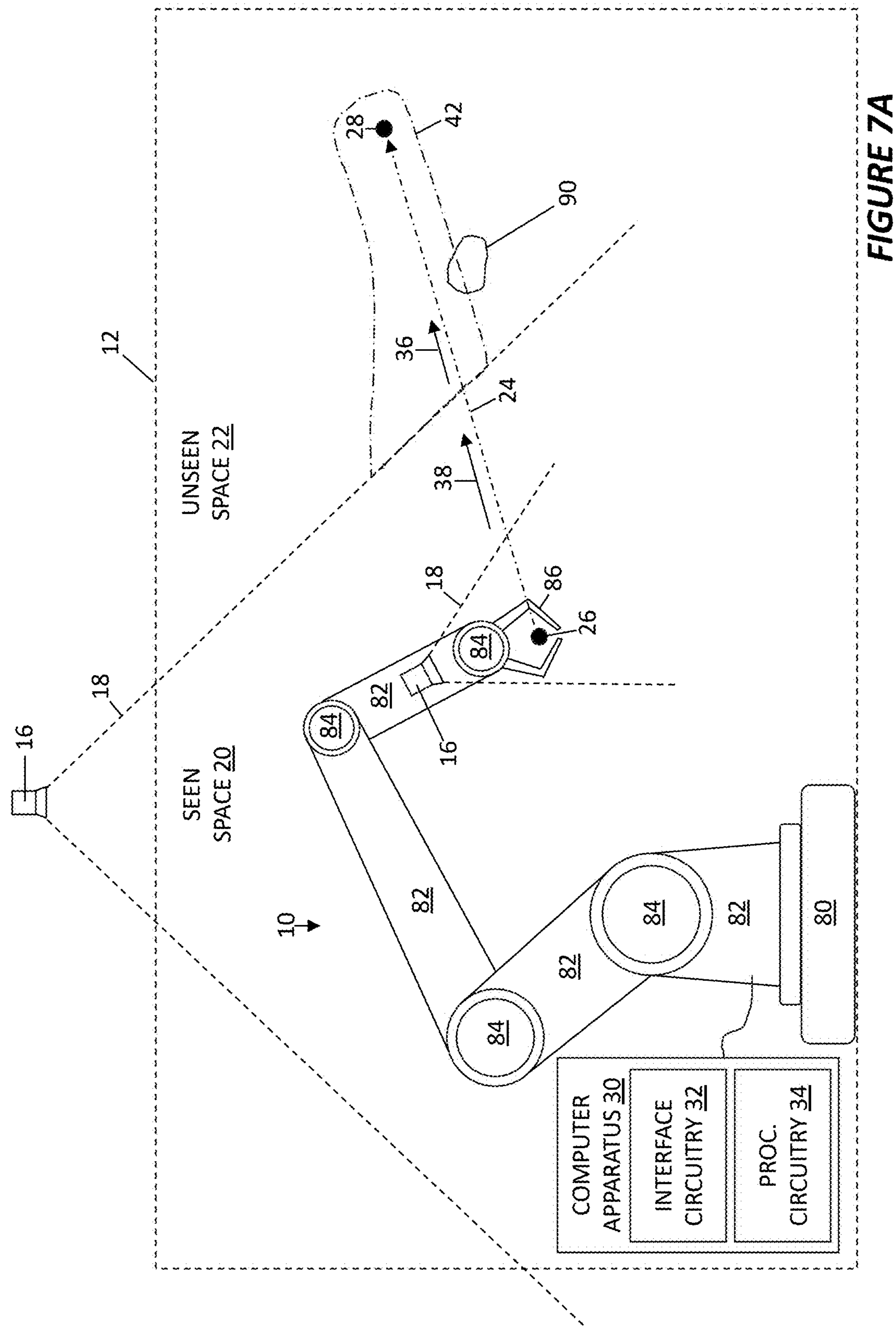
FIG. 7A is a block diagram of a robotic manipulator, according to another example embodiment.

FIG. 7A illustrates another example of a robotic manipulator 10, which, in the example depiction includes a base 80, a number of links 82, and movable joints 84 interconnecting the links 82. An end effector 86 at the end of the links 82 of the robotic manipulator 10 provides for workpiece interaction.

FIG. 7A also illustrates the use of two sensors 16, one mounted external to the robotic manipulator 10 and one mounted on one of the links 82 of the robotic manipulator 10. As will be appreciated from the multi-link arrangement shown for the robotic manipulator 10, there may be a wide range of candidate poses that can be evaluated for the link-mounted sensor 16, for incremental exposure of the hypothesized path 36 and incremental progression of the end effector 86 towards the goal pose 28.

With the goal pose 28 being within unseen space, and consistent with the method 300, the computer apparatus 30 determines an overall path 24 for the robotic manipulator 10 to move from a starting pose 26 to the goal pose 28. The overall path 24 includes a portion 38 that exists within seen space 20 and is thus computed based on sensor data obtained for the seen space 20. Further, the overall path 24 includes a hypothesized path 36, which is that portion of the overall path 24 that lies within unseen space 22 and is based on the initial or starting assumption that no obstacles lie within the interest region 42.

Figure 7C:
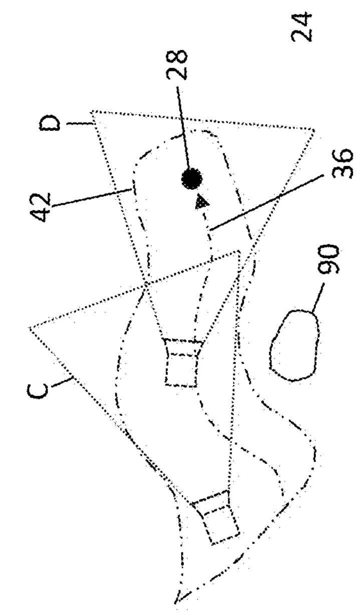
FIGS. 7B-7C are diagrams of example path planning for the robotic manipulator of FIG. 7A.
Figure 7B:
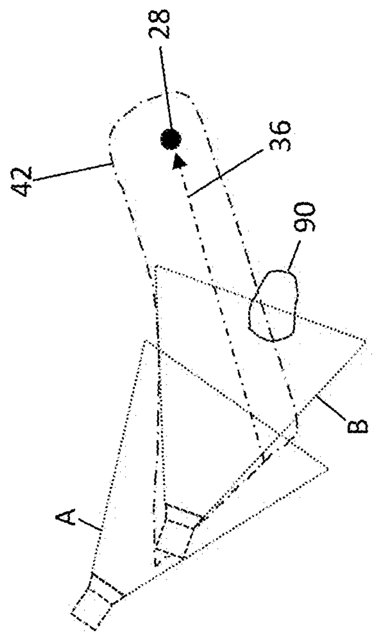

However, in this example, an object 90 intrudes into the interest region 42, as initially calculated for the hypothesized path 36. FIG. 7B illustrates a first incremental exposure of the interest region 42, i.e., based on selecting a most strategic first sensor pose for exposing the interest region 42. This first exposure is labeled "A" in the diagram.

Because the first exposure A does not reveal the obstacle 90, the hypothesized path 36 is not updated and operations continue with moving to perform a next incremental exposure of the interest region 42. This second exposure is labeled "B" in the diagram and it results in detection of the obstacle 90.

Sensing the obstacle 90 during the second exposure B triggers a re-computation—updating—of the hypothesized path 36 and a corresponding re-computation of the interest region 42. FIG. 7C illustrates an example re-computation of the hypothesized path 36, showing adaptation of the hypothesized path 36 for avoidance of the obstacle 90, and further showing a corresponding updating of the interest region 42 in correspondence with the updates to the hypothesized path 36.

The example assumes that no further obstacles are present along the updated hypothesized path 36, and two more incremental exposures, labeled as "C" and "D" in the diagram, are sufficient to reveal the remainder of the updated interest region 42. As with the incremental exposures A and B, the incremental exposures C and D may be understood as being selected in dependence on the above described path exposure procedure.

Figure 9:
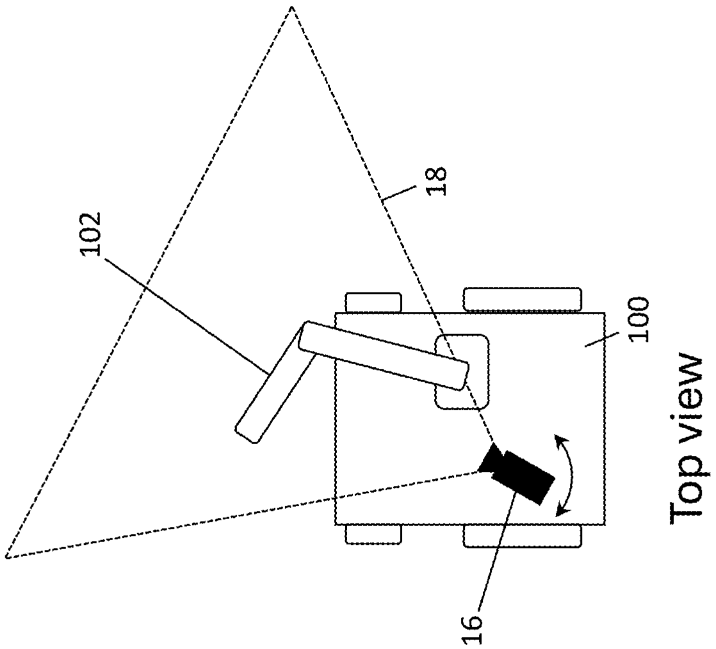
FIGS. 8 and 9 are diagrams of a robotic manipulator, according to further example embodiments.
Figure 8:
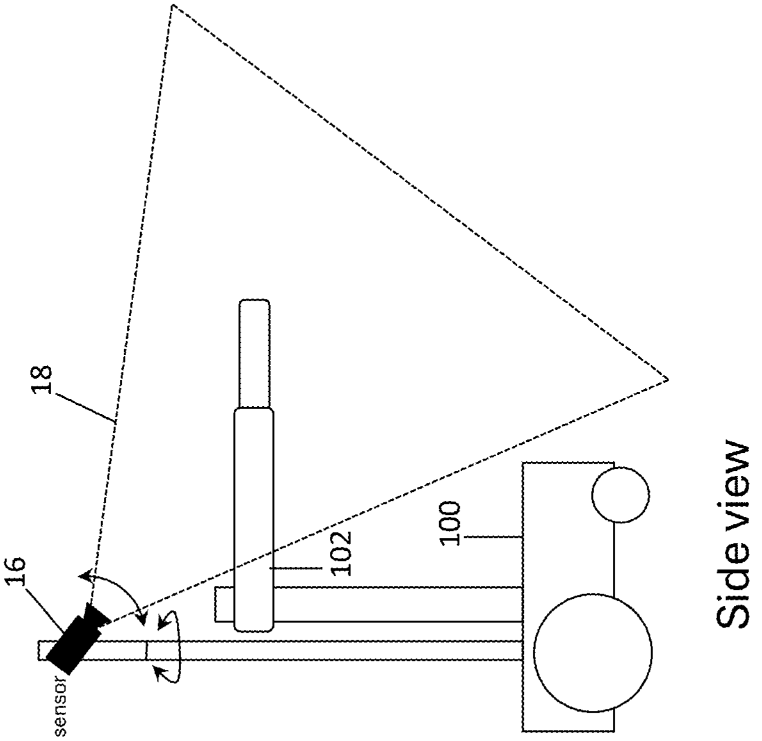

FIGS. 8 and 9 are diagrams illustrating yet another example configuration of a robotic manipulator 10, this example configuration including a mobile base 100, which carries a pole-mounted sensor 16 that has tilt and pan capability, along with the mobile base 100 carrying a robotic arm 102. In this example configuration, positioning of the robotic arm 1022 depends on movement of the arm itself, and movement of the mobile base 100. Likewise, for purposes of incremental exposure via the described path exposure procedure, the sensor pose of the pole-mounted sensor 16 within the workspace is a function of movement of the mobile base 100, along with pan/tilt movement of the sensor 16.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of path planning for movement of a robotic manipulator from a starting pose to a goal pose within a configuration space of the robotic manipulator, the method comprising:

planning an overall path for the robotic manipulator to move from the starting pose to the goal pose, wherein at least a portion of the overall path overlaps with unseen space within the configuration space and comprises a hypothesized path determined in dependence on treating the unseen space as unoccupied;

estimating an interest region as that volume within the unseen space that would be swept by the robotic manipulator while traversing along the hypothesized path; and incrementally sensing the interest region for object detection and corresponding responsive modification of the hypothesized path, according to a path exposure procedure that comprises:

determining a next sensor pose for sensing a next portion of the interest region via a sensor associated with the robotic manipulator;

responsive to detecting no obstacles in the next portion of the interest region and there being remaining interest region to sense, advancing to a next repetition of the path exposure procedure; and responsive to detecting one or more obstacles in the next portion of the interest region, updating the hypothesized path for avoidance of the detected one or more obstacles and correspondingly updating the interest region, and then advancing to a next repetition of the path exposure procedure.

2. The method according to claim 1, wherein the hypothesized path is a nominal path determined on an assumption of no interfering obstacles in the interest region.

3. The method according to claim 1, wherein, with respect to any portion of the overall path that overlaps with seen space within the configuration space for which occupancy is known, planning the overall path includes accounting for the known occupancy.

4. The method according to claim 1, wherein planning the overall path includes receiving application information regarding one or more tasks to be performed by the robotic manipulator and determining the goal pose from the application information.

5. The method according to claim 1, wherein the robotic manipulator comprises a robotic arm.

6. The method according to claim 1, wherein the robotic manipulator comprises a robotic arm mounted on a movable base, and wherein planning the overall path for the robotic manipulator accounts for one or both of movement of the robotic arm and movement of the movable base.

7. The method according to claim 1, wherein determining the next sensor pose for sensing the next portion of the interest region comprises, for two or more candidate next sensor poses, determining a corresponding next portion of the interest region that would be exposed, ranking the corresponding next portions of the interest region in terms of one or more ranking metrics, and choosing the next sensor pose as a highest ranked one of the candidate next sensor poses.

8. The method according to claim 7, wherein the one or more ranking metrics comprise any one or more of: a volume metric, a goal distance metric, an orientation-constraint metric, or a manipulability metric.

9. The method according to claim 1, wherein the sensor is a camera having a defined field of view, wherein the next most strategic sensor pose is a selected camera pose, and wherein different camera poses provide different positions and orientations of the camera for sensing different portions of the configuration space.

10. The method according to claim 9, wherein the camera is movably mounted on a link of the robotic manipulator, such that any particular camera pose depends on at least one of: movement of the robotic manipulator within the configuration space, or movement of the camera relative to the link.

11. The method according to claim 1, wherein updating the hypothesized path for avoidance of the detected one or more obstacles and correspondingly updating the interest region comprises:

updating the hypothesized path according to a new hypothesis that avoids the detected one or more obstacles and treats a remaining portion of the unseen space as unoccupied; and updating the interest region according to the new hypothesis.

12. The method according to claim 1, wherein the method further comprises advancing the robotic manipulator within the configuration space, in conjunction with incrementally visualizing the interest region.

13. The method according to claim 1, wherein the path exposure procedure includes, responsive to detecting no obstacles in the next portion of the interest region and there being no remaining interest region to sense, reverting to path planning according to known occupancies of corresponding seen space.

14. A computer apparatus configured to perform path planning for movement of a robotic manipulator from a starting pose to a goal pose within a configuration space of the robotic manipulator, the computer apparatus comprising:

interface circuitry; and processing circuitry configured to:

plan an overall path for the robotic manipulator to move from the starting pose to the goal pose, wherein at least a portion of the overall path overlaps with unseen space within the configuration space and comprises a hypothesized path determined in dependence on treating the unseen space as unoccupied;

estimate an interest region as that volume within the unseen space that would be swept by the robotic manipulator while traversing along the hypothesized path; and incrementally sensing the interest region for object detection and corresponding responsive modification of the hypothesized path, according to a path exposure procedure that comprises:

determining a next sensor pose for sensing a next portion of the interest region via a sensor associated with the robotic manipulator; and responsive to detecting no obstacles in the next portion of the interest region and there being remaining interest region to sense, advancing to a next repetition of the path exposure procedure; or responsive to detecting one or more obstacles in the next portion of the interest region, updating the hypothesized path for avoidance of the detected one or more obstacles and correspondingly updating the interest region, and then advancing to a next repetition of the path exposure procedure.

15. The computer apparatus according to claim 14, wherein the processing circuitry is configured to determine the hypothesized path as a nominal path that is based on an assumption of no interfering obstacles in the interest region.

16. The computer apparatus according to claim 14, wherein, with respect to any portion of the overall path that overlaps with seen space within the configuration space for which occupancy is known, the processing circuitry is configured to account for the known occupancy with respect to planning the overall path.

17. The computer apparatus according to claim 14, wherein, for planning the overall path, the processing circuitry is configured to receive application information regarding one or more tasks to be performed by the robotic manipulator and determine the goal pose from the application information.

18. The computer apparatus according to claim 14, wherein the robotic manipulator comprises a robotic arm.

19. The computer apparatus according to claim 14, wherein the robotic manipulator comprises a robotic arm mounted on a movable base, and wherein, with respect to planning the overall path for the robotic manipulator, the processing circuitry is configured to account for one or both of movement of the robotic arm and movement of the movable base.

20. The computer apparatus according to claim 14, wherein, for determining the next sensor pose for sensing the next portion of the interest region, the processing circuitry is configured to, for each of two or more candidate next sensor poses, determine a corresponding next portion of the interest region that would be exposed, rank the corresponding next portions of the interest region in terms of one or more ranking metrics, and choose the next sensor pose as a highest ranked one of the candidate next sensor poses.

21. The computer apparatus according to claim 20, wherein the one or more ranking metrics comprise any one or more of: a volume metric, a goal distance metric, an orientation-constraint metric, or a manipulability metric.

22. The computer apparatus according to claim 14, wherein the sensor is a camera having a defined field of view, wherein the next most strategic sensor pose is a selected camera pose, and wherein different camera poses provide different positions and orientations of the camera for sensing different portions of the configuration space.

23. The computer apparatus according to claim 22, wherein the camera is movably mounted on a link of the robotic manipulator, such that any particular camera pose depends on at least one of: movement of the robotic manipulator within the configuration space, or movement of the camera relative to the link.

24. The computer apparatus according to claim 14, wherein, for updating the hypothesized path for avoidance of the detected one or more obstacles and correspondingly updating the interest region, the processing circuitry is configured to:

update the hypothesized path according to a new hypothesis that avoids the detected one or more obstacles and treats a remaining portion of the unseen space as unoccupied; and update the interest region according to the new hypothesis.

25. The computer apparatus according to claim 14, wherein the processing circuitry is further configured to advance the robotic manipulator within the configuration space, in conjunction with incrementally visualizing the interest region.

26. The computer apparatus according to claim 14, wherein the path exposure procedure includes, responsive to detecting no obstacles in the next portion of the interest region and there being no remaining interest region to sense, the processing circuitry reverting to path planning according to known occupancies of corresponding seen space.

* * * * *